US 6,625,743 B1

(12) United States Patent
Gulick

(10) Patent No.: US 6,625,743 B1
(45) Date of Patent: Sep. 23, 2003

(54) METHOD FOR SYNCHRONIZING GENERATION AND CONSUMPTION OF ISOCHRONOUS DATA

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 35 days.

(21) Appl. No.: 09/933,290

(22) Filed: Aug. 20, 2001

Related U.S. Application Data

(62) Division of application No. 09/109,440, filed on Jul. 2, 1998, now Pat. No. 6,279,058.

(51) Int. Cl.[7] .............................. G06F 1/12; G06F 3/00; G06F 3/02
(52) U.S. Cl. .......................... 713/400; 713/600; 710/5; 710/58
(58) Field of Search ....................... 710/5, 58; 713/400, 713/401, 600

(56) References Cited

U.S. PATENT DOCUMENTS

| | | | | |
|---|---|---|---|---|
| 4,021,784 A | * | 5/1977 | Kimlinger | 713/401 |
| 4,807,259 A | * | 2/1989 | Yamanaka et al. | 375/358 |
| 5,452,434 A | * | 9/1995 | MacDonald | 713/601 |
| 5,479,646 A | * | 12/1995 | Proebsting | 711/167 |
| 5,642,487 A | * | 6/1997 | Flynn et al. | 711/167 |
| 5,778,218 A | * | 7/1998 | Gulick | 713/503 |
| 5,848,046 A | * | 12/1998 | Sawada | 369/47.35 |
| 6,021,425 A | * | 2/2000 | Waldron et al. | 709/103 |
| 6,041,066 A | * | 3/2000 | Meki et al. | 370/512 |
| 6,061,746 A | * | 5/2000 | Stanley et al. | 710/10 |
| 6,061,802 A | * | 5/2000 | Gulick | 713/400 |
| 6,202,164 B1 | * | 3/2001 | Gulick | 713/400 |
| 6,493,407 B1 | * | 12/2002 | Sheafor et al. | 375/356 |

* cited by examiner

Primary Examiner—Thomas Lee
Assistant Examiner—Chun Cao
(74) Attorney, Agent, or Firm—Meyertons Hood Kivlin Kowert & Goetzel, P.C.; B. Noël Kivlin

(57) ABSTRACT

A method of synchronizing the generation and consumption of isochronous data in a computer system. In one embodiment, a computer system implements a method comprising providing a plurality of clocks to a plurality of isochronous sinks or sources configured to generate or consume the isochronous data, outputting a master clock signal to the plurality of isochronous sinks or sources, synchronizing said clocks to said master clock signal so that the generation or consumption of the isochronous data is synchronized to said master clock signal, outputting said master clock signal to an interrupt controller, and generating an interrupt based on said master clock signal, wherein a processor schedules one or more tasks that generate or consume data based on said interrupt. The isochronous sinks or sources may also be synched to a multiple of the master clock signal.

14 Claims, 7 Drawing Sheets

METHOD FOR SYNCHRONIZING GENERATION AND CONSUMPTION OF ISOCHRONOUS DATA

This application is a divisional application of U.S. patent application Ser. No. 09/109,440, filed Jul. 2, 1998, now U.S. Pat. No. 6,279,058.

BACKGROUND OF THE INVENTION

1. Field of the Invention

This invention relates to computer systems and, more particularly, to synchronizing clocks within computer systems.

2. Description of the Related Art

Computer systems, such as personal computer systems, were originally developed for business applications such as word processing, databases and spread sheets, among others. Computer systems, however, are currently being used to handle a number of isochronous tasks including: multimedia applications having video and audio components, video capture and playback, telephony applications, and speech recognition and synthesis, among others. Generally speaking, isochronous tasks are time-dependent tasks. In other words, the data handled by an isochronous task must be delivered or processed within certain time constraints.

One problem that has arisen is that computer systems originally designed for business applications are not well suited to the time-dependent requirements of modern multimedia applications. For example, modern computer system architectures still presume that the majority of applications executed are business applications, such as word processing or spread sheet applications. Typical computer systems are inefficient at handling streams of time-dependent data, or isochronous data, that make up multimedia data types. The isochronous data of multimedia tasks require the maintenance of a temporal component. For example, audio signals may be coded as a stream of samples taken at a consistent sampling rate. The temporal relationship between these samples must be maintained to prevent perceptible errors such as gaps or altered frequencies. Likewise, the loss of the temporal relationship in a video signal can cause blank screens or lines.

To accommodate isochronous data, computer systems typically employ one or more data buses configured to handle the transfer of isochonrous data. Examples of these data buses include the Universal Serial Bus (USB), the IEEE 1394 bus, and the Audio Codec '97 (AC '97) bus. Unfortunately, the isochronous buses of a computer system are typically independently designed. Accordingly, the buses may have independent data rates. Further, even buses with a common data rate and devices coupled to those buses typically have independent clocks that drift relative to each other. These differences in clock rates create discrepancies in the rates at which data is generated and consumed.

Typical computer systems include buffers to accommodate the lack of synchronization and drift between the clocks of a computer system. Unfortunately, buffers add expense, size, and latency to computer systems. Therefore, it is desirable to reduce the size of the buffers within computer systems.

What is desired is a clock structure in which the various clocks of the data buses and/or devices coupled to those buses within the computer system are synchronized.

SUMMARY OF THE INVENTION

The problems outlined above are in large part solved by a master isochronous clock structure in accordance with the present invention. In one embodiment, a frame-rate clock of a plurality of data buses are synchronized to a master clock signal. The master clock signal may be derived from the existing clocks signals within the computer system or from data received from an external source. The master clock signal may also be used by an operating system scheduler to schedule task that generate or consume blocks of isochronous data.

In an alternative embodiment, the drift of a device clock signal relative to a master clock signal is measured and used to synchronize the device clock signal. For example, a mechanism may monitor the level of data in a data buffer. The level of data in the data buffer is a measure of the drift between the clock generating the data and the clock consuming the data. Based upon the level of data in the buffer, synchronization information is provided to synchronize the rates of the clock signals that generate and consume the data. In one embodiment, the level of data in a data buffer is used to synchronize the clock of a video camera. In another embodiment, the level of data in a data buffer is used to synchronize a clock of a telephony codec.

Broadly speaking, the present invention contemplates a computer system including a central processing unit (CPU), a first data bus coupled to the CPU and configured to transfer data at a first clock rate, a second data bus coupled to the CPU and configured to transfer data at a second clock rate, and a clock controller coupled to the CPU, the first data bus and the second data bus. The clock controller is configured to receive a clock signal from the first data bus and output a master clock signal to the second data bus, such that the second clock rate approximates the first clock rate.

The present invention further contemplates a computer system including: a CPU, a first data bus coupled to the CPU and configured to receive data from a first isochronous device at a first clock rate, a second data bus coupled to the CPU and configured to transfer data at a second clock rate, and a clock controller coupled to the CPU, the first data bus and the second data bus. The clock controller is configured to receive the data from the isochronous device and output a master clock signal to the second data bus, such that the second clock rate approximates the first clock rate.

The present invention still further contemplates a method of synchronizing multiple clocks in a computer system comprising: selecting a clock signal as a master clock signal; outputting the master clock signal to one or more clocks; and synchronizing the one or more clocks to the master clock signal.

BRIEF DESCRIPTION OF THE DRAWINGS

A better understanding of the present invention can be obtained in the following detailed description when the disclosed embodiments are considered in conjunction with the following drawings, in which.

Figure 1:
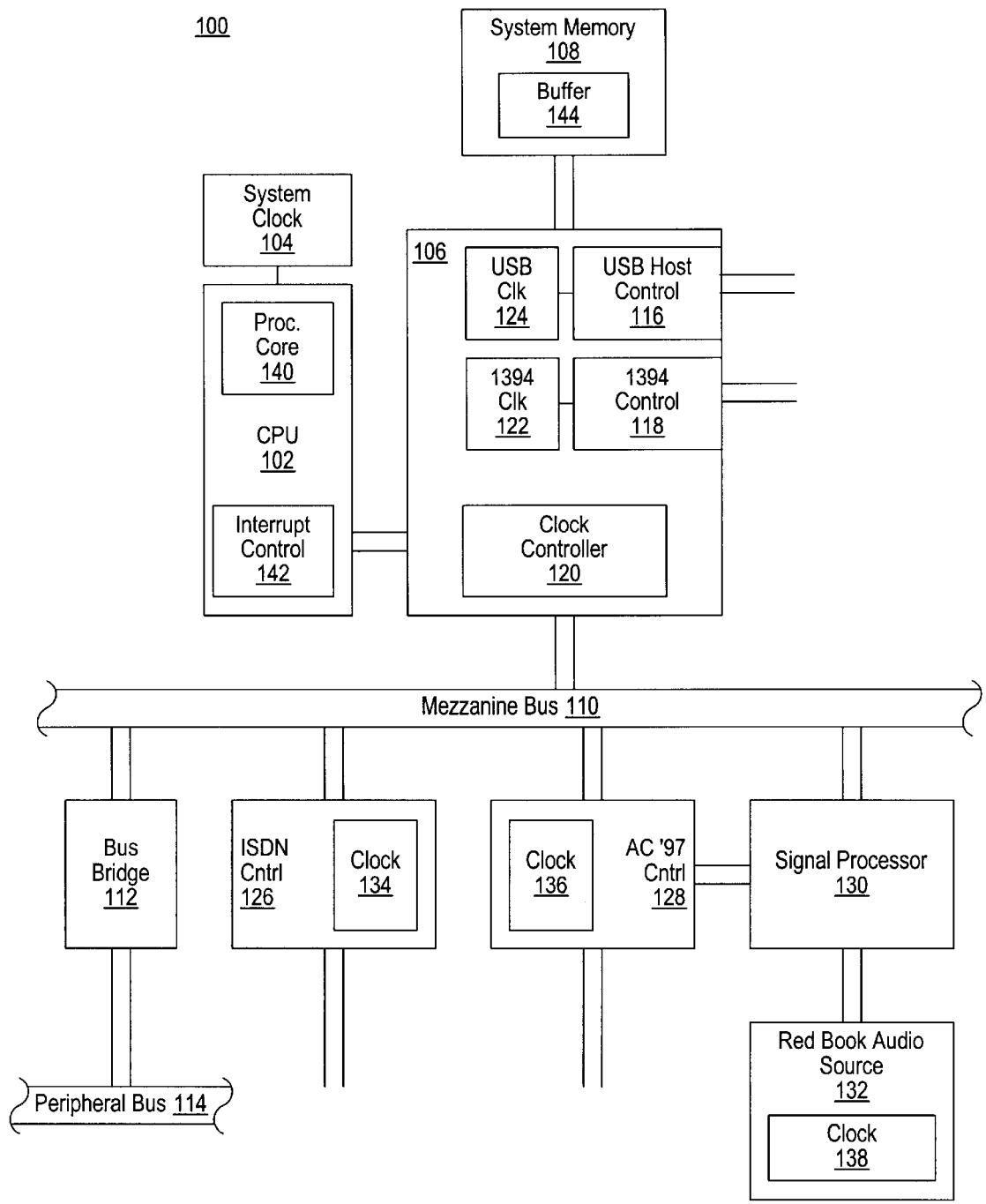
FIG. 1 is a block diagram of the computer system including a plurality of data buses according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF THE INVENTION

Turning now to FIG. 1, a computer system 100 includes a CPU 102 clocked by a system clock 104. CPU 102 may be any of a variety of processors including those implementing the x86 instruction set. CPU 102 is coupled to a bus bridge 106 which includes a memory controller (not shown), a USB host controller 116 and an IEEE 1394 controller 118. Bus bridge 106 is further coupled to system memory 108, which may include a pre-determined portion set aside as a data buffer 144. System memory 108 preferably includes one or more random access memory (RAM) arays. Data buffer 144 may comprise one or more dual port first-in/first-out (FIFO) RAM arays, or merely a predetermined portion of main memory. Bus bridge 106 is further coupled to a mezzanine bus 110. Mezzanine bus 110 may implement any of a variety of data bus protocols, including the Peripheral Component Interconnect (PCI) bus.

Mezzanine bus 110 is coupled to bus bridge 112, which is in turn coupled to peripheral bus 114. Peripheral bus 114 may implement any of a variety of data bus protocols including the Extended Industry Standard Architecture (EISA) bus. Mezzanine bus 110 is further coupled to ISDN controller 126, AC '97 controller 128 and signal processor 130. ISDN controller 126 includes clock 134. AC '97 controller 128 includes clock 136. Signal processor 130 is coupled to AC '97 controller 128 and red book audio source 132. Red book audio source 132 includes clock 138.

Computer system 100 sends and receives isochonous data to isochonous devices via one or more data buses or data interfaces. For example, computer system 100 may send and receive data from an isochronous device via the USB, IEEE 1394 or AC '97 bus. In one embodiment, isochronous data received by computer system 100 is stored in buffer 144. The isochronous data stored in buffer 144 may be read by CPU 102 or may be output to an isochonous device via one of the data buses of computer system 100. For example, audio data may be received from red book audio source 138 via signal processor 130. The audio data may be temporarily stored in buffer 144. USB host controller 116 may read the data from buffer 144 and output it to a powered loudspeaker (not shown).

In the illustrated embodiment, red book audio source 132 provides data samples to signal processor 130. Signal processor 130 may internally process the data or may output the data on mezzanine bus 110. AC '97 controller 128 is coupled to mezzanine bus 110 and signal processor 130. Data output to a device coupled to AC '97 bus may be received directly from mezzanine bus 110 or the data may be sent to signal processor 130 for processing and then transferred to AC '97 controller 128.

As shown in FIG. 1, each bus controller and data source may receive individual clock signals. For example, USB host controller 116 receives a clock signal from USB clock 124. IEEE 1394 controller 118 receives a clock signal from clock 122. ISDN controller 126 receives a clock signal from clock 134. AC '97 controller 128 receives a clock signal from clock 136, and red book audio source 132 receives a clock signal from clock 138. In one embodiment, a clock may include two clock signals. A first clock signal, called a data clock signal, is typically a high frequency clock signal that defines a clock rate at which bits of data are transferred. A second clock signal, called a frame clock signal, is typically a lower frequency signal that defines the rate at which frames of data are transferred. In other embodiments, a clock may only provide a frame clock signal.

The frame rate of the clocks of computer system 100 may be independent. In other words, the frame clock signals may have different rates and be asynchronous relative to each other. For example, the rate of the frame clock signal of USB clock 124 may be 1 kilohertz (kHz). The rate of the frame clock signal of clock 122 may be 8 kHz. The rate of clock 136 may be 48 kHz, the rate of clock 138 may be 44.1 kHz, and the rate of clock 134 may be 8 kHz. Although clocks 122 and 134 may have the same nominal rates, clock drift may lead to slightly different frequencies.

Figure 2:
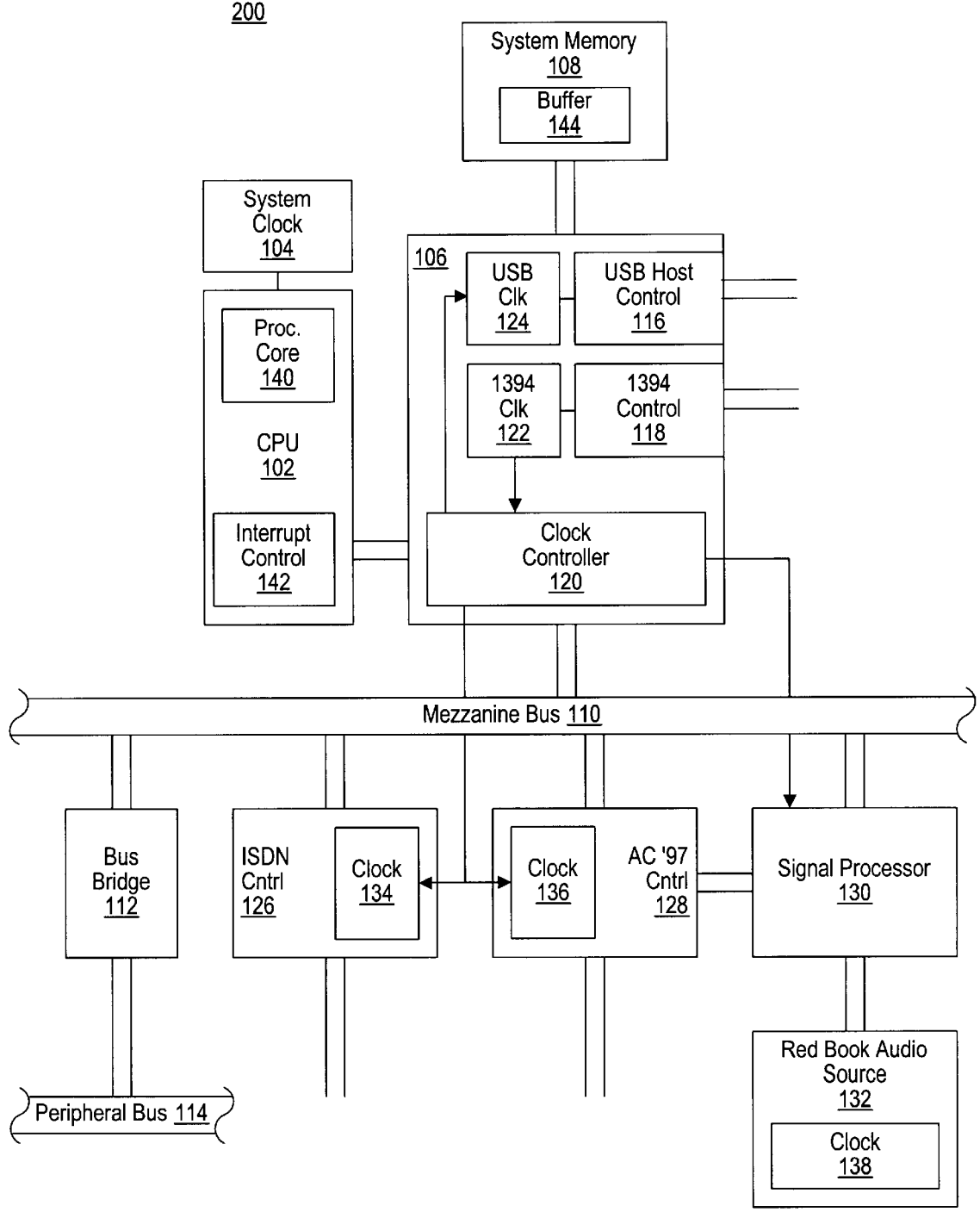
FIG. 2 is a block diagram of the computer system in which a plurality of clocks are synchronized to an internal master clock according to one embodiment of the present invention.

Turning now to FIG. 2, a computer system in which a plurality of clock signals are synchronized to an internal clock signal is shown. In the illustrated embodiment, the rates of the frame clock signals of a plurality of clocks within the computer system are synchronized to a master clock signal. The clock signals may be generated from the master clock signal or an existing clock signal may be synchronized to the master clock signal.

In one embodiment, the master clock signal is selected from one of the existing clock signals within the computer system. For example, the frame clock signal of clock 122 may be selected as the master clock signal. Clock 122 may be selected because the frame rate is the same as ISDN clock 134, a multiple of the frame rate of USB clock 124, and a divisor of the frame rate of clock 136.

In the illustrated embodiment, clock 122 is coupled to clock controller 120. Clock controller 120 distributes a master clock signal based on the frame clock signal of clock 122 to the other clocks in the computer system. In the illustrated embodiment, clock controller 122 outputs a master clock signal to USB clock 124, clock 134 and clock 136. By generating clock signals from the master clock signal, these clocks will be synchronized to each other. In other words, the clock drift between the clock signals is minimized. As noted above, reducing the clock drift between clock signals reduces the size of buffers necessary to temporarily store data transferred between the resources of the computer system.

It is noted that clock 122 may not be disabled while the master clock signed is based on it. Clock controller 120 may select a different clock on which to base the master clock signal prior to disabling clock 122. Alternatively, clock 122 may remain enabled throughout the operational period of the computer system.

Clock controller 120 may additionally provide the master clock signal to interrupt controller 142 of CPU 102. In one embodiment, interrupt controller 142 provides an interrupt signal to processor core 140. In one embodiment, interrupt controller 142 may include a divider to divide the master clock signal down to generate an interrupt to processor core 140. For example, interrupt controller 142 may divide the 8 kHz master clock signal by eight to generate an interrupt to processor core 140 every millisecond. In one embodiment, the amount by which the divider divides the master clock signal is programmable. Processor core 140 may use the interrupt signal to schedule tasks that generate or consume blocks of data. By synchronizing the tasks that generate and consume data to the devices and buses that generate and consume data, the buffering required between CPU 102 and the devices and buses may be reduced.

In one embodiment, the frame clock rate of a resource may be sufficiently distinct from the master clock signal rate to make synchronization difficult or impractical. For example, the frame clock rate of clock 138 may be 44.1 kHz. This frequency is difficult to synchronize with the master clock signal rate of 8 kHz. Accordingly, rather than attempt to synchronize the clock signals, signal processor 130 may interpolate the data from red book audio source 132. Generally speaking, interpolation is a mathematical process that converts data sampled at one clock rate to data sampled at a higher clock rate. In the illustrated embodiment, clock controller 120 outputs the master clock signal to signal processor 130 so that signal processor 130 may interpolate the data from red book audio source 132 to the frequency of the master clock signal.

In one embodiment, the controllers within the computer system are designed such that the number of cycles of the data clock signal relative to the frame clock signal is variable. In other words, the frame clock rate may be adjusted such that the number of cycles of the data clock signal per frame clock cycle changes. In another embodiment, the number of cycles of the data clock signal relative to the frame clock signal is fixed. In this embodiment, the data clock signal may be generated from the frame clock signal. For example, a phase-lock loop may be used to generate the data clock signal from the frame clock signal.

Figure 3:
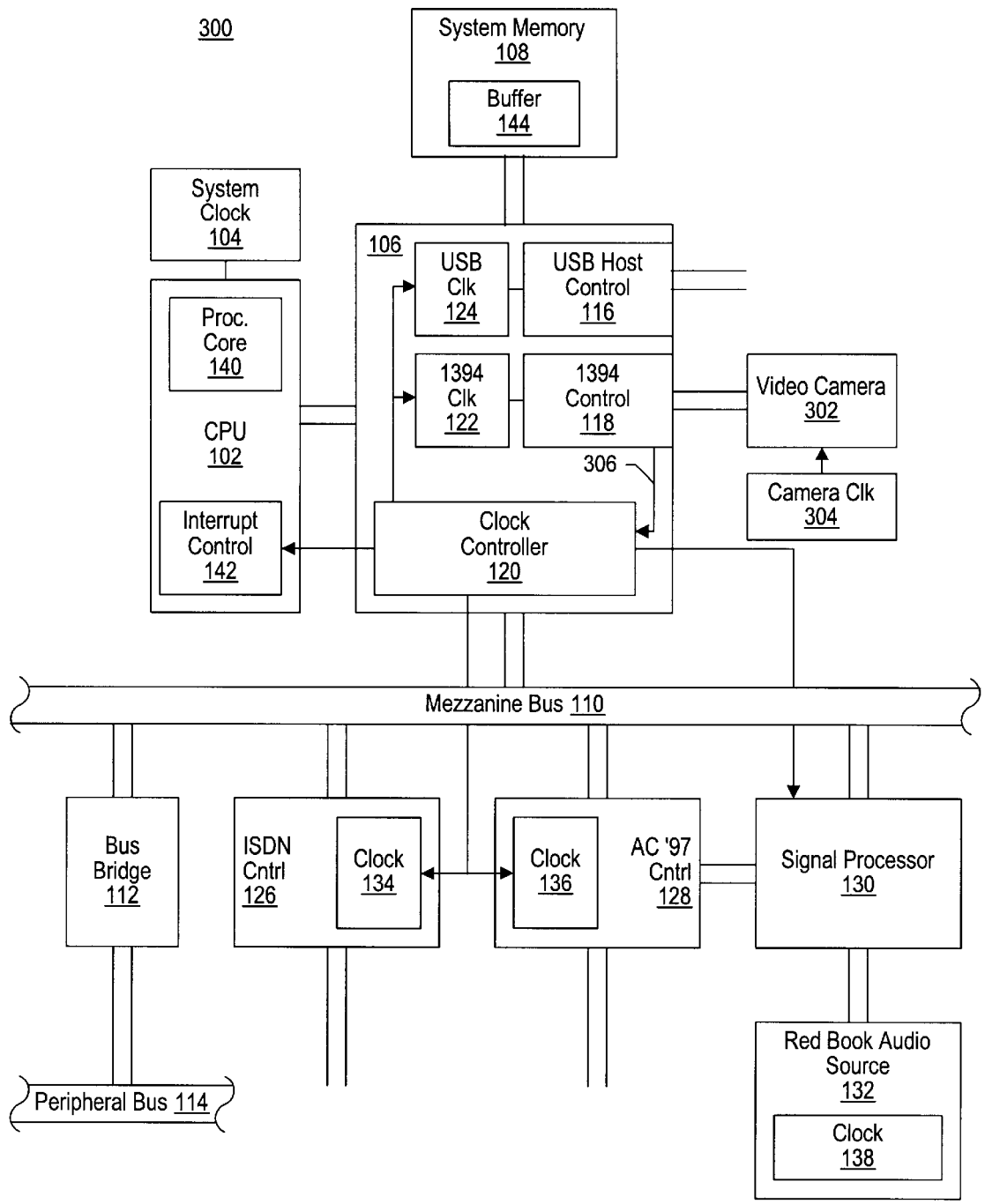
FIG. 3 is a block diagram of a computer system in which a plurality of clocks are synchronized to an external clock signal according to one embodiment of the present invention.

Turning now to FIG. 3, a computer system configured to synchronized a plurality of clocks to an external data clock signal is shown. In the illustrated embodiment, video camera 302 is coupled to the IEEEE 1394 bus. A camera clock 304 provides a clock signal to video camera 302. In one embodiment, the computer system is unable to adjust the rate of camera clock 304. In one particular embodiment, clock controller 120 synchonrizes the clocks of the computer system to the rate of the data received from video camera 302. In this manner, the internal clocks of the computer system are synchonrized to camera clock 304.

In the illustrated embodiment, clock controller 120 outputs a master clock signal to USB clock 124, clock 122, clock 134, and clock 136. Controller 118 may detect the lead or lag of clock 122 relative to camera clock 304 and provide a lead/lag control signal 306 to clock controller 120. Because clock 122 is synchronized to the master clock signal from clock controller 120, measuring the lead or the lag of clock 122 relative to camera clock 304 effectively measures the lead or lag of the master clock signal relative to camera clock 304. Clock controller 120 may use lead/lag signal 306 to synchronize the master clock signal to camera clock 304. Alternatively, the master clock signal may be derived directly from the external data signal and provided to clock 122.

In the illustrated embodiment, clock controller 120 provides the master clock signal to interrupt controller 142, which generates an interrupt to processor core 140. An operating system scheduler operating on processor core 140 may schedule tasks that generate or consume data based on the interrupt. Clock controller 120 may additionally output a control signal to signal processor 130, which interpolates data from red book audio source 132.

If the computer system receives data from more than one external device, the computer system may not be able to synchronize the clocks to both external devices. For example, if an isochronous device coupled to the USB generates data using its own clock, the computer system could not synchronize to both that clock and camera clock 304. In one embodiment, the computer system synchronizes the master clock to one of the external data streams and interpolates the other data stream.

Figure 4:
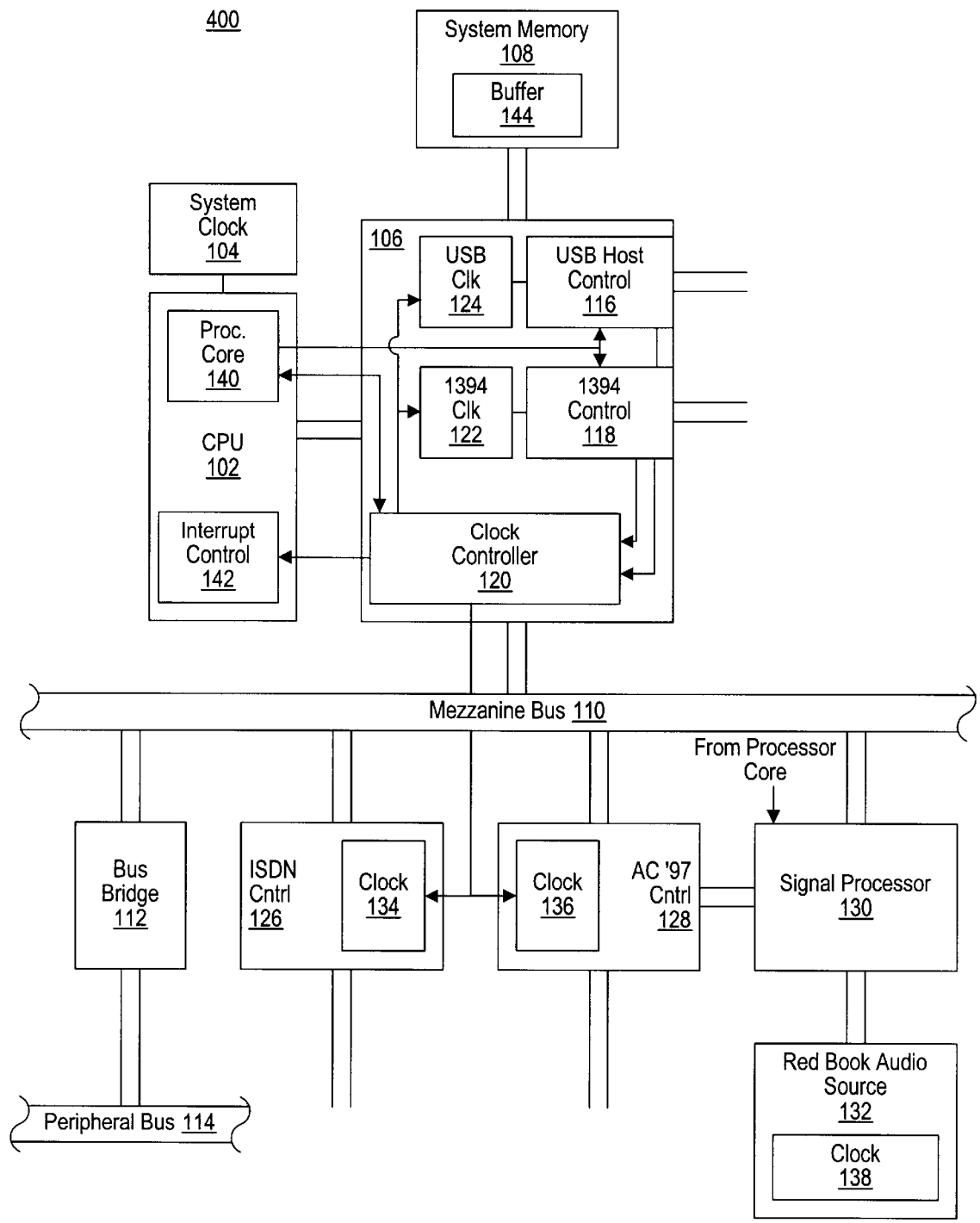
FIG. 4 is a block diagram of a computer system in which synchronization of a plurality of clocks are performed by software according to one embodiment of the present invention.

Turning now to FIG. 4, a computer system in which clock synchronization is under software control is shown. In one embodiment, a software driver running as a kernel on an operating system of the computer system manages clock synchronization. The clock synchronization software may choose to adjust the rate of the master clock signal to match the data rate of an external data stream, or may choose to adjust the interpolation factor of various data generators and consumers to accommodate clock rate mismatches.

In the illustrated embodiment, clock controller 120 outputs a master clock signal to USB clock 124, clock 122, clock 134 and clock 136. As discussed above, the master clock signal may be used to generate frame clock signals that are synchronized throughout the computer system. Clock controller 120 is further coupled to USB controller 116 and controller 118. Clock controller 120 receives information indicative of which, if any, external devices output data streams based on an external clock to the computer system. Clock controller 120 may convey information regarding the external devices to processor core 140. Based upon the external data received and the applications currently running on the computer system, processor core 140 may choose to synchronize the master clock signal to an external device or synchonrize the master clock signal to an internal device. Processor core 140 may output control signals to clock controller 120 to select the source of the master clock signal. Processor core 140 may additionally output control signals to USB host controller 116, controller 118 and signal processor 130. These control signals may be used to adjust an interpolation factor to match the clock rate of the devices to the master clock signal.

In one embodiment, the computer system may receive data from a first external device coupled to controller 116 and a second external device coupled to USB host controller 118. The clock synchronization software may receive an indication from clock controller 120 that data from two external sources are received. The clock synchronization software may choose to synchronize the master clock signal to the device coupled to controller 118. The clock synchronization software may output a control signal to clock controller 120 which causes clock controller 120 to synchronize the master clock signal to that device. The clock synchronization software additionally may output a control signal to USB host controller 116 and signal processor 130 causing those devices to interpolate the data received to match the clock rate of the master clock signal. Alternatively, the clock synchronization software may choose to synchronize the master clock signal to the device coupled to USB host controller 116. In this embodiment, the clock synchronization software outputs a control signal to clock controller 120 to synchronize the master clock signal to that device. The clock synchronization software may additionally output control signals to controller 118 and signal processor 130 to interpolate the data received.

Figure 5:
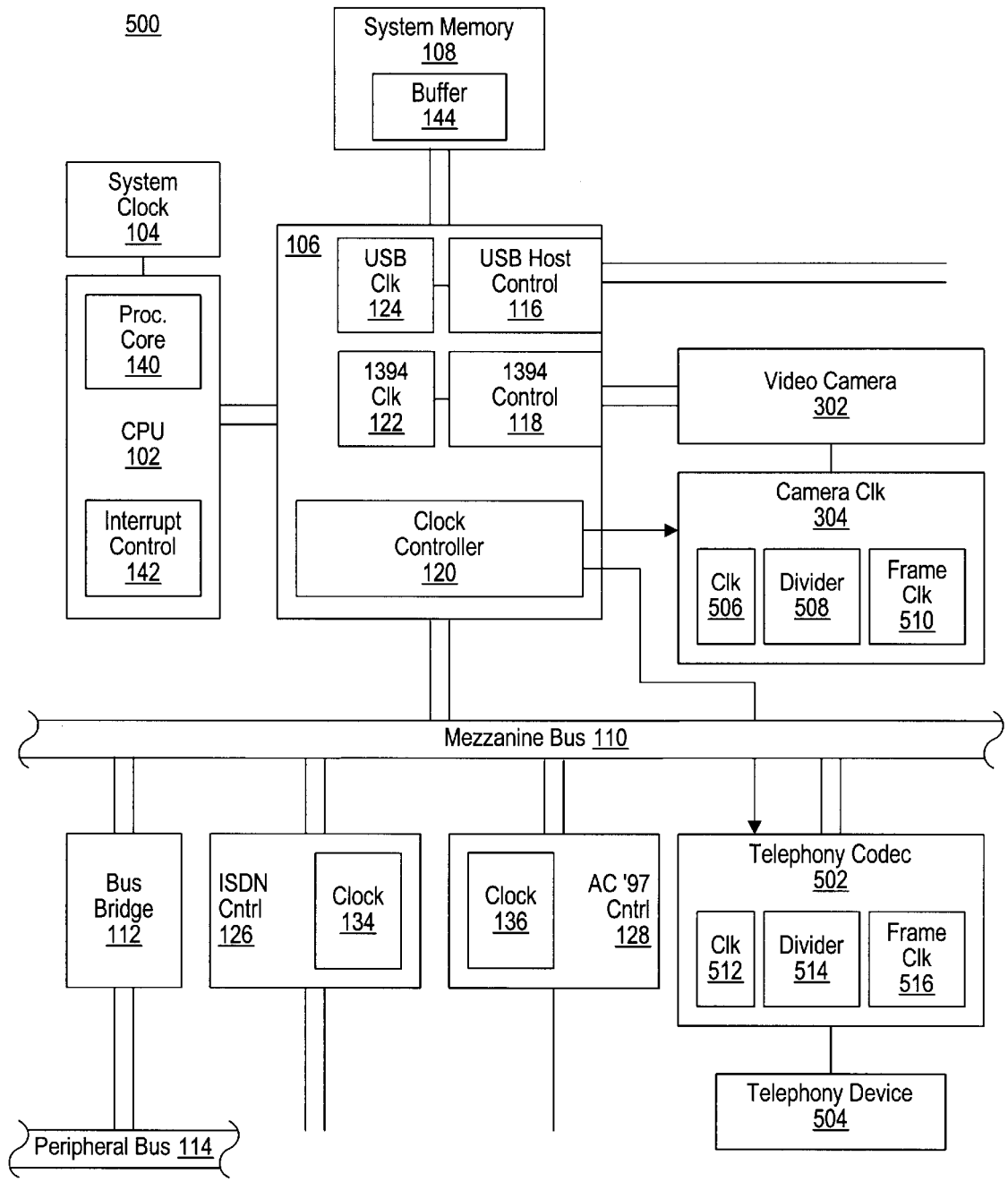
FIG. 5 is a block diagram of a computer system that synchronizes the clocks of external devices according to one embodiment of the present invention.

Turning now to FIG. 5, a computer system configured to adjust the clock rate of an external device according to one embodiment in the present invention is shown. Computer system 500 includes a video camera 302, a camera clock 304, a telephony codec 502 and a telephony device 504. Camera clock 304 includes a clock 506, a divider 508, and a frame clock 510. Telephony codec 502 includes a clock 512, a divider 514 and a frame clock 516. As discussed in more detail below, the rate of a frame clock is adjusted based upon the level of data in a buffer. In one embodiment, clock controller 120 receives a data level signal indicating the level of data in the buffer. The threshold signal may indicate whether the data is above or below a predetermined threshold. Based on the threshold signal, clock controller 120 may adjust the amount by which a clock is divided to generate the frame clock. Computer system 500 includes two external devices: video camera 302 and telephony device 504. Although synchronization of the frame clock rate of each device is discussed separately, both devices may be synchronized concurrently by the computer system.

In one embodiment, video camera 302 generates video data at a predetermined sample rate. The sample rate is based on frame clock 510, which is generated by dividing down clock 506. The video data is routed to a buffer 144 in system memory 108. In one embodiment, clock controller 120 monitors the level of data in buffer 144. If the level of data is too high, or exceeds a predetermined threshold, clock controller 120 conveys a threshold signal to camera clock 304. Based on the threshold signal, the rate of the frame clock signal may be adjusted by altering the divisor of divider 508. In an alternate embodiment, processor core 140 may monitor the level of data in buffer 144 and output a signal to camera clock 304 to adjust the rate of the frame clock signal.

In one embodiment, clock controller 120 monitors the level of data in buffer 144 by monitoring one or more flags provided by the buffer. For example, buffer 144 may output a threshold flag indicating that the level of data within the buffer exceeds a predetermined threshold. It is noted that the level of data that is monitored may be set arbitrarily at a predetermined threshold level. In one embodiment, the threshold flag indicates when the buffer is half full. If buffer 144 is more than half full, the divisor of divider 508 is increased and rate of frame clock 510 is decreased. Conversely, if buffer 144 is less than half full, the divisor of divider 508 may be decreased and the rate of frame clock 510 increased. In one embodiment, the rate of frame clock 510 is increased and decreased in arbitrary predetermined intervals. In one embodiment, the frame clock rate may be adjusted by approximately 1000 parts per million (ppm) in ten steps. In other words, the rate of the frame clock may be adjusted in 100 ppm steps.

Buffer 144 may additionally provide a full flag and an empty flag. The full flag goes active when the buffer is full and the empty flag goes active when the buffer is empty.

In one embodiment, telephony device 504 generates data at a predetermined sample rate. The sample rate is based on frame clock 516, which is generated by dividing down clock 512. The video data is routed to a buffer in system memory 108. It is noted that a unique buffer is utilized for each device. In other words, if video camera 302 is using buffer 144, telephony device 504 will use a different buffer. In one embodiment, clock controller 120 monitors the level of data in buffer 144. If the level of data is too high, or exceeds a predetermined threshold, clock controller 120 transmits a signal to telephony codec 502, which adjusts the rate of the frame clock signal. The frame rate of the clock signal may be adjusted by altering the divisor of divider 514. In an alternate embodiment, processor core 140 may monitor the level of data in buffer 144 and output a signal to telephony codec 502 to adjust the rate of the frame clock signal.

In one embodiment, clock controller 120 monitors the level of data in buffer 144 by monitoring one or more flags provided by the buffer. For example, buffer 144 may output a threshold flag indicating that the level of data within the buffer exceeds a predetermined threshold. It is noted that the level of data that is monitored may be set arbitrarily at a predetermined threshold level. In one embodiment, the threshold flag indicates when the buffer is half full. If buffer 144 is more than half full, the divisor of divider 514 is increased and rate of frame clock 516 is decreased. Conversely, if buffer 144 is less than half full, the divisor of divider 514 may be decreased and the rate of frame clock 516 increased. In one embodiment, the rate of frame clock 516 is increased and decreased in arbitrary predetermined intervals. In one embodiment, the clock rate may be adjusted by approximately 1000 parts per million (ppm) in ten steps. In other words, the rate of the frame clock may be adjusted in 100 ppm steps.

Figure 6:
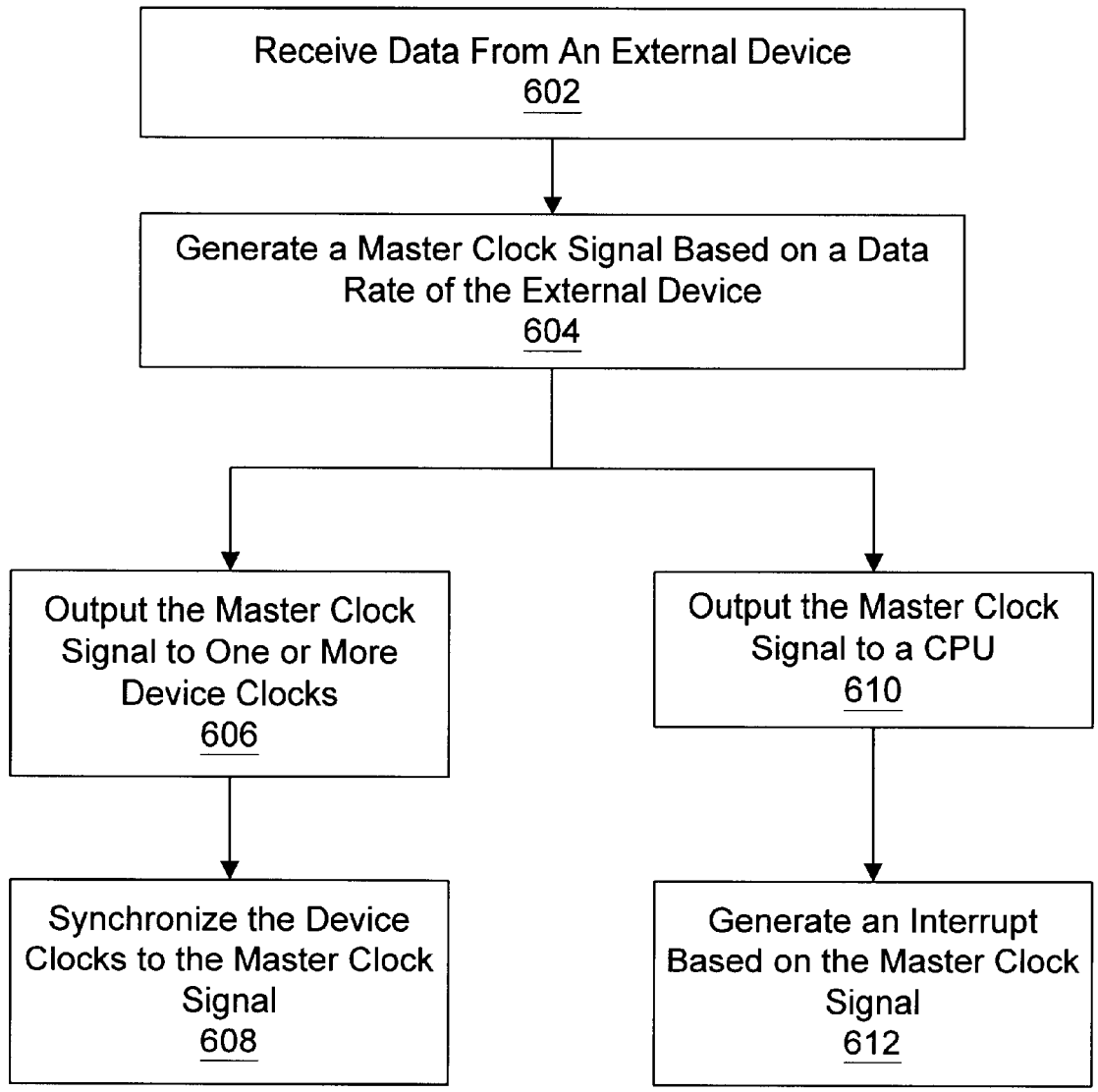
FIG. 6 is a flowchart diagram illustrating the synchronization of a plurality of clocks in a computer system according to one embodiment of the present invention.

Turning now to FIG. 6, a flowchart diagram illustrating the synchronization of a plurality of clocks in a computer system according to one embodiment of the present invention is shown. In step 602, data from an external device is received by the computer system. In step 604, a master clock signal is generated based on the data rate of the external device. In step 606, the master clock signal is output to one or more clocks. The clock signal may be a frame clock signal of devices or data busses within the computer system. In step 608, the clock signals are synchronized to the master clock signal. In one embodiment, the clock signals are generated from the master clock signal such that the clocks are synchronized. In step 610, the master clock signal is output to a processor. In step 612, an interrupt is generated based on the master clock signal. In one embodiment, an operating system of the processor schedules tasks that generate or consume data based on the interrupt.

Figure 7:
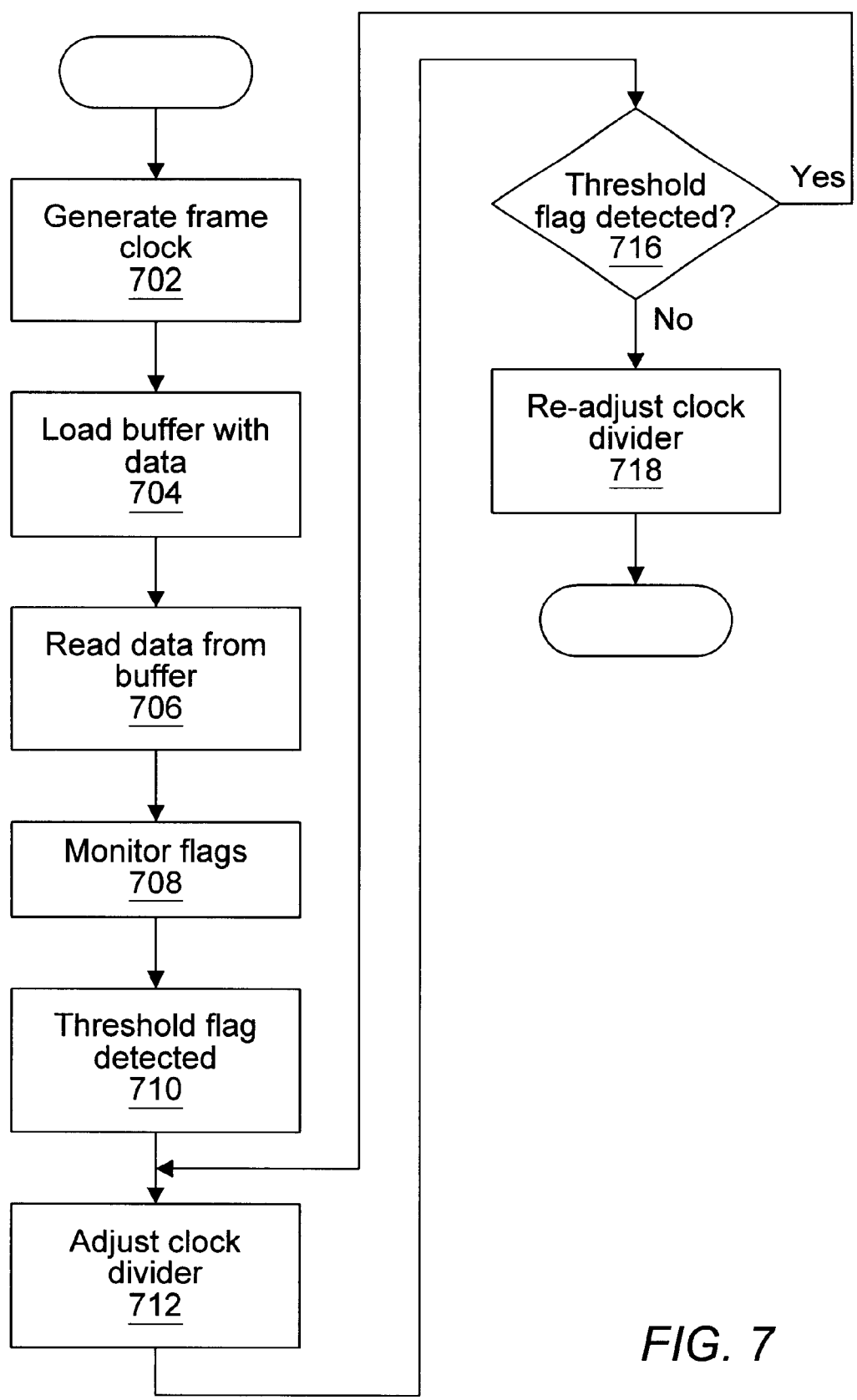
FIG. 7 is a flowchart diagram of a method for adjusting the frame clock of an external device according to one embodiment of the present invention.

Turning now to FIG. 7, a flowchart diagram of a method for adjusting the frame clock of an external device is shown. In step 702, a data clock signal is divided down to generate a frame clock signal. In step 704, a buffer is loaded with data from an external device. The rate at which data is loaded is based on the rate of the frame clock signal. In step 706, data is read from the buffer. In one embodiment, the data is read by another device. In an alternative embodiment, the data may be read by a processor or a bus interface unit. In step 708, the flags of the buffer are monitored. In one embodiment, the buffer includes a full flag, an empty flag, and a threshold flag. In step 710, the threshold flag is detected. In one embodiment, a clock controller outputs a signal to the device clock which causes the clock divider to be adjusted such that the frame clock rate is adjusted downward. In an alternative embodiment, the clock controller may provide a signal to a processor, which outputs a signal that causes the clock divider to adjust the rate of the frame clock. The clock controller continues to monitor the threshold flag. In step 716, it is determined whether the threshold flag is detected. If the threshold flag is detected, then control returns to step 712. Alternatively, if the threshold flag is not detected, the clock controller may use this as indication that the frame clock is too slow and increase the rate of the frame clock in step 718. The net effect of the clock adjustments is an equilibrium about the threshold level.

It is noted that in an alternative embodiment a plurality of threshold flags are used. A first threshold flag may indicate an upper bound of the desired clock rate and a second threshold flag may indicate a lower bound of the desired clock rate. If the data in the buffer causes the first threshold flag to be asserted, the frame clock rate is decreased. If the data in the buffer causes the second threshold flag to be asserted, the rate of the frame clock is increased. If the data in the data buffer remains at a level between the threshold flags, the clock adjustment is successful and no adjustment is necessary.

Under normal operating conditions, the full flag and empty flag should remain unasserted. If the full flag is asserted, the buffer has overflowed and is reset.

In an alternative embodiment, the data rate of the device may be determined by periodically reading the level of data in the buffer and adjusting the clock rate based on whether the data level is increasing or decreasing. In this embodiment, if the level of the data buffer increases by a predetermined amount, the data rate of the frame clock is decreased. Alternatively, if the data level of the buffer decreases by a predetermined amount, the frame clock rate is increased.

What is claimed is:

1. A method of synchronizing the generation and consumption of isochronous data in a computer system, comprising:

providing a plurality of clocks to a plurality of isochronous sinks or sources configured to generate or consume the isochronous data;

outputting a master clock signal to the plurality of isochronous sinks or sources;

synchronizing said clocks to said master clock signal so that the generation or consumption of the isochronous data is synchronized to said master clock signal;

outputting said master clock signal to an interrupt controller; and generating an interrupt based on said master clock signal, wherein a processor schedules one or more tasks that generate or consume data based on said interrupt.

2. The method of claim 1 wherein said clocks are synchronized to a multiple of said master clock signal.

3. A computer system comprising:

a processor;

a plurality of isochronous data sinks or sources configured to consume or generate isochronous data, wherein the plurality of isochronous data sinks or sources comprises a plurality of tasks that generate or consume isochronous data, wherein the processor is configured to schedule the plurality of tasks; and a clock controller configured to generate a master clock signal, wherein the consumption or generation of isochronous data by the isochronous data sinks or sources is synchronized to the master clock signal.

4. The computer system of claim 3, further comprising an interrupt controller, wherein the clock controller is configured to provide the master clock signal to the interrupt controller, wherein the interrupt controller is configured to generate an interrupt to the processor so that the generation or consumption of isochronous data by the plurality of tasks is synchronized to the master clock signal.

5. The computer system of claim 4, wherein the interrupt controller is further configured to divide the master clock signal.

6. The computer system of claim 3, further comprising a system clock configured to clock the processor by generating a system clock signal, wherein the master clock signal is derived from the system clock signal.

7. The computer system of claim 3, wherein the clock controller is configured to derive the master clock signal from a frame clock of one of the isochronous data sinks or sources.

8. The computer system of claim 3, wherein the clock controller is configured to derive the master clock signal from a data rate at which one of the isochronous data sinks or sources is generating or consuming isochronous data.

9. The computer system of claim 8, wherein the clock controller is further configured to adjust the master clock signal in response to a lead or a lag between the master clock signal and a clock of one of the isochronous data sinks or sources.

10. The computer system of claim 3, wherein one of the isochronous data sources or sinks is configured to synchronize a clock of the isochronous data source or sink to the master clock signal in response to a drift of the clock of the isochronous data source or sink relative to the master clock signal.

11. The computer system of claim 10, further comprising a data buffer configured to buffer isochronous data transfers, wherein the drift is measured by a level of isochronous data in the data buffer.

12. The computer system of claim 3, wherein the clock controller is configured to generate a plurality of clock signals from the master clock signal and to provide the plurality of clock signals to the plurality of isochronous data sources or sinks.

13. The computer system of claim 3, further comprising a signal processor configured to synchronize the generation or consumption of isochronous data by one or more of the isochronous data sources or sinks to the master clock signal by interpolating the isochronous data being generated or consumed.

14. The computer system of claim 3, wherein a rate of the master clock signal is controlled by software.

* * * * *